Patented June 16, 1953

2,642,446

UNITED STATES PATENT OFFICE 2,642,446

PRODUCTION OF 7-DEHYDROSTEROLS

Roland Kapp, Newark, N. J., Saul Chodroff, Brooklyn, N. Y., and Le Roy Sofield, Red Bank, N. J., assignors to Nopco Chemical Company, Harrison, N. J., a corporation of New Jersey No Drawing. Application January 7, 1950, Serial No. 137,494

8 Claims. (Cl. 260—397.2)

This invention relates to the production of 7-dehydrosterols and more particularly to a process for producing 7-dehydrosterols in improved yields and in a high state of purity.

In recent years a number of proposals have been made regarding production of 7-dehydrosterols. In most of these processes the sterol ester has been halogenated with a suitable N-halogenated acid amide or imide and the halogenated ester which is obtained is reacted with a dehydrohalogenating agent to produce the corresponding 7-dehydrosterol ester. The desired 7-dehydrosterol is then obtained by saponification of the 7-dehydrosterol ester. Several of these processes have proved to be quite efficient for the production of 7-dehydrosterols as long as the processes are employed in the production of small scale quantities of the 7-dehydrosterols. However, it has been found that when large amounts of the sterol esters are employed in such processes, the percentage yields and the purities of the products obtained are often considerably lower than when small amounts of sterol esters are employed in the processes. Thus in many cases when amounts of sterol esters as large as about 5,000 grams or greater are processed, the 7-dehydrosterol obtained is obtained in a substantially smaller percentage yield and in a considerably lower purity than when only small amounts such as amounts of 100 grams or less of the sterol esters are utilized in the process. In these prior art processes it has been the custom to carry out the halogenation of the sterol ester in a solvent such as a hydrocarbon solvent or halogenated hydrocarbon solvent, following the halogenation to filter off the amide or imide formed in the reaction, then to mix the halogenation reaction mixture with the dehydrohalogenating agent to be employed and thereafter to heat the resulting mixture to drive off the solvent employed during the halogenation step. Alternatively, in the prior art the solvent employed as the solvent medium for the halogenation step has been evaporated from the halogenation reaction mixture following the filtration therefrom of the amide or imide produced by the halogenation reaction, the dehydrohalogenating agent has then been admixed with the 7-halogeno sterol ester and then the dehydrohalogenation reaction has been carried out.

It is the object of this invention to provide an improved process for the production of 7-dehydrosterols.

Another object of the invention is to provide a process for producing 7-dehydrosterols which will give higher yields of the desired product than the prior art processes when large quantities of sterol esters are processed.

A further object of the invention is to provide a process for producing large amounts of 7-dehydrosterols having a high degree of purity.

Other objects of the invention will in part be obvious and will in part appear hereinafter.

The above and other objects of the invention may be accomplished by carrying out the production of a 7-dehydrosterol in the same manner as in the prior art processes discussed hereinabove with the very important exception that instead of admixing the halogenation reaction mixture with the dehydrohalogenating agent and then evaporating therefrom the solvent medium in which the halogenation reaction mixture has been carried out, or alternatively evaporating such solvent medium from the halogenation reaction mixture and then admixing the 7-halogeno sterol ester with the dehydrohalogenating agent, one instead merely cools the halogenation reaction mixture, after removal by filtration or other suitable means of the amide or imide formed in the reaction, to a relatively low temperature, i. e. 0° C. to —15° C. or lower, and then filters the 7-halogeno sterol ester from the cooled reaction solvent. The 7-halogeno sterol ester thus obtained is then dehydrohalogenated as in the prior art processes and the resulting 7-dehydrosterol ester saponified to give the desired 7-dehydrosterol. The exact reason as to why such a change in the separation of the 7-halogeno sterol ester from the halogenation reaction mixture should result in much higher yields of products having a higher degree of purity than when operating in accordance with the prior art processes has not been definitely ascertained. As pointed out above, when operating on a small laboratory scale, the processes of the prior art will give essentially the same excellent results as obtained with the present process. However, when large amounts of sterol ester are processed as in large scale plant operations, it has been found that the process of the present invention gives yields of from 100 per cent to 300 per cent or more greater than the yields obtained with the prior art processes and furthermore the products which are obtained by the present process in large scale plant operations have a purity which is significantly greater than the purity of the products obtained by the prior art processes.

The process of the invention is applicable to the processing of any sterol unsaturated in the 5,6 position to produce a 7-dehydrosterol. Thus sterols such as cholesterol, epicholesterol, β-sitosterol, campesterol, etc. may all be treated by the process of our invention. In carrying out the process of the invention on such sterols, the hydroxy group on the 3-position is, of course, protected by esterification. The acyl radical of the sterol esters employed may be derived from either aliphatic or aromatic acids. Thus esters such as formates, acetates, propionates, butyrates, stearates, dioxalates, benzoates, dinitrobenzoates, etc. may be treated by the process of our invention. In view of the somewhat greater ease of crystallization of the benzoate esters from the solvents employed in the halogenation reactions, it is preferred that the benzoate esters of the sterols be employed in the process of the invention.

A number of different halogenating agents may suitably be employed in the process of the invention. Thus any of the halogenating agents disclosed in British patent 574,432 or those disclosed in U. S. Patent No. 2,468,859 may be employed in the process of the invention. These compounds include, among others, compounds such as N-bromosuccinimide, N-bromophthalimide, N-bromo-acetamide, N-bromo-m-nitrobenzamide, etc. Of the many compounds disclosed in the two patents, it is preferred to employ N-bromo-succinimide in view of the somewhat better results obtained with this compound.

The halogenation reaction is carried out in accordance with the prior art processes in a solvent medium which is inert to both the reaction components and to the products of the reaction. Thus saturated hydrocarbon solvents, halogenated hydrocarbon solvents, aliphatic ethers and aliphatic esters may all be used as solvent media in which to carry out the halogenation reaction. Thus solvents such as pentane, hexane, heptane, octane, petroleum ether, cyclohexane, carbon tetrachloride, ethyl ether, ethyl acetate, etc. may all be employed. Preferably a saturated aliphatic hydrocarbon solvent such as hexane is employed in the process. In carrying out the halogenation, the sterol ester is dissolved in a solvent of the type just set forth and admixed with a suitable halogenating agent. The halogenation may then be effected by heating the reaction mixture such as at the reflux temperature of the solvent employed. Preferably, we employ an organic peroxide as a catalyst for the halogenation reaction in accordance with the disclosure of copending U. S. patent application, Ser. No. 765,631 of W. L. Ruigh, filed August 1, 1947, now abandoned. The ratio of solvent to the reactants is not critical, except that there should be sufficient solvent to dissolve the sterol esters completely and to allow for efficient crystallization of the 7-halogeno sterol ester from the solvent after removal of the amide or imide formed from the halogenating agent. Ordinarily, a volume of solvent which is about eight times the volume of the reactants is sufficient. The amount of halogenating agent required is the same, of course, as that utilized in the prior art processes, i. e., at least one mol of the halogenating agent for each mol of the sterol ester and preferably a slight excess of the halogenating agent is employed. Among the peroxide catalysts which are suitable for use in the halogenating process, there may be mentioned lauroyl peroxide, benzoyl peroxide, stearyl peroxide, etc. The amount of peroxide employed is usually about 0.5 per cent of a mol of peroxide compound per mol of sterol ester being halogenated. It is not necessary, of course, to employ a catalyst during the halogenation reaction, but in most cases higher yields of the desired end product will usually be obtained when such a catalyst is employed.

On the completion of the halogenation reaction, the reaction mixture is cooled to about room temperature and the amide or imide formed from the halogenating agent, e. g. the succinimide formed from bromosuccinimide, is filtered from the halogenation reaction mixture as in the prior art processes.

Then, instead of following the prior art procedures, the remainder of the halogenation reaction mixture is cooled to a temperature substantially below room temperature, i. e. to at least about 0° C. to —15° C. When the benzoate ester of the sterol has been employed, it will be found that the 7-halogeno sterol ester will rapidly crystallize from the cooled halogenation reaction mixture. Some of the other sterol esters are slightly more soluble in the solvents employed as the media in which to carry out the halogenation reaction and with such esters it may be necessary to cool the halogenation reaction mixture to a temperature somewhat below —15° C. in order for efficient crystallization of the ester to occur. The exact temperature to employ for any particular combination of solvent and ester may readily be ascertained from a small scale laboratory experiment. In most cases, however, temperatures of approximately —15° C. will cause the greater portion of the 7-halogeno sterol esters to crystallize readily from the solvent. If desired the solvent solution may be concentrated to one-half or one-third its original volume prior to the crystallization. For the most efficient and the most consistent results, however, the crystallization is carried out without any such prior concentration of the solution. The crystallized 7-halogeno sterol ester is then removed from the solvent by any suitable means, e. g. filtration, centrifugation, etc.

The 7-halogeno sterol ester which has been isolated from the halogenation reaction mixture in accordance with the process of the invention is then subjected to dehydrohalogenation as in the prior art processes. Suitable dehydrohalogenating agents which may be employed include organic bases such as diethyl aniline, dimethyl aniline, quinoline and collidine. We much prefer, however, to employ the compound quinaldine as the dehydrohalogenating agent and to carry out the dehydrohalogenation reaction with quinaldine in an aromatic hydrocarbon solvent such as xylene in accordance with the process disclosed and claimed in U. S. patent application No. 93,409 of Kurt H. Schaaf, filed May 14, 1949, now Patent No. 2,546,788. The dehydrohalogenation is conveniently carried out by heating the mixture of the 7-halogeno sterol and the dehydrohalogenating agent being employed to a temperature between about 90° C. and about 150° C., or higher if desired. Preferably an excess of the dehydrohalogenating agent is utilized such as for example, from 3 to 5 mols of dehydrohalogenating agent per mol of 7-halogeno sterol ester.

Following the dehydrohalogenation reaction, the 7-dehydrosterol ester may be recovered from the dehydrohalogenation reaction mixture by any suitable means such as by solvent extraction of the ester as disclosed in the British patent and in the U. S. patent referred to hereinabove wherein the dehydrohalogenation reaction mixture is admixed with an aqueous acid solution such as aqueous hydrochloric acid and this mixture extracted with a solvent such as petroleum ether or, alternatively, the dehydrohalogenation reaction mixture is first mixed with a solvent such as petroleum ether or xylene or other suitable organic solvent and then extracted with an aqueous acid solution. In either case the excess of the dehydrohalogenating agent will react with the acid in the aqueous acid solution to form a water soluble salt which will be washed from the solvent layer along with the hydrohalide salt of the dehydrohalogenating agent formed during the dehydrohalogenation reaction. The solvent solution of the 7-dehydrosterol ester is then washed with an aqueous alkali solution to remove any acid dissolved in the solution and then with water to remove any alkali in the solution. On removal of the solvent from the solvent solution, the 7-dehydrosterol ester which is recovered may be subjected to saponification to produce the desired 7-dehydrosterol. Such saponification procedures are well known in the art and for the sake of brevity will not be set forth herein.

It will be found in all cases that when relatively large amounts of sterol esters are processed to produce 7-dehydrosterols by the process of our invention the yields obtained and the purity of the products obtained will be substantially greater than the yields and the purity of the products obtained by the prior art processes.

For a fuller understanding of the nature and objects of the invention, reference may be had to the following examples which are given merely as further illustrations of the invention and are not to be construed in a limiting sense.

Example I

Nine thousand grams of cholesteryl benzoate were dissolved at reflux in 72 liters of hexane in a large glass-lined kettle. When the cholesteryl benzoate had been completely dissolved, the solution was cooled slightly and then 4070 grams of N-bromosuccinimide and 45 grams of lauroyl peroxide were added thereto. The mixture was then heated at the reflux temperature of the hexane and stirred vigorously for about 20 minutes. Following this it was cooled to room temperature and the succinimide formed in the reaction and which had precipitated was filtered from the solution using 9 liters of hexane to rinse the reaction kettle and wash the precipitate of succinimide and unreacted N-bromosuccinimide. The hexane solution and washings were combined and the hexane distilled therefrom in vacuo (thus following the prior art procedure for isolating the 7-bromo cholesteryl benzoate). The crude 7-bromo cholesteryl benzoate thus obtained was admixed with 4500 ml. of quinaldine and 33.75 liters of xylene and the mixture refluxed with stirring for 30 minutes. After cooling the mixture to room temperature, the precipitated quinaldine hydrobromide was filtered from the solution and washed with 9 liters of xylene. The combined xylene solutions were then washed with 12 liters of concentrated hydrochloric acid diluted with 24 liters of water to remove unreacted quinaldine. The xylene was then distilled by steam distillation and the residue extracted with one 18 liter portion and two 4 liter portions of chloroform. The chloroform extracts were concentrated to one-third their volume and then 54 liters of acetone admixed therewith. The acetone solution was chilled overnight at —5° C. and then the crystallized 7-dehydrocholesteryl benzoate filtered therefrom and washed with 4 liters of acetone. A yield of 2645 grams of the ester having a purity of 69.9 per cent was obtained. The ester was converted to the free sterol by admixing the ester with 1140 grams of KOH dissolved in 13 liters of ethanol and refluxing the mixture for one hour. The free sterol was precipitated from the saponification mixture by adding 3 liters of water and 13 liters of ethanol to the mixture and cooling the mixture. The sterol was filtered from the cooled solution and then recrystallized from 8 liters of isopropyl acetate. A yield of 1251 grams of 7-dehydrocholesterol having a purity of 80.05 per cent was obtained. Thus a total of 1001 grams of 7-dehydrocholesterol or 111 grams of 7-dehydrocholesterol per each kilogram of cholesteryl benzoate employed as the starting material was obtained.

Example II

In another plant run the amount of cholesteryl benzoate employed was increased from the 9 kilograms employed in Example I to 12 kilograms. The amounts of the other reactants employed were increased proportionately as compared to the amounts employed in Example I. In all other respects this run was carried out in the same manner as that of Example I. It was found that increasing the size of the batch further decreased the yields of the desired products obtained when operating in accordance with the prior art procedure for separating the 7-bromo cholesteryl benzoate from the halogenation reaction mixture. Thus only 1767 grams of 7-dehydrocholesteryl benzoate having a purity of 76.8 per cent were obtained. Another 12 kilogram plant batch was processed in the same manner, giving only 1541 grams of 7-dehydrocholesteryl benzoate having a purity of 74.3 per cent. The 7-dehydrocholesteryl benzoate from the two 12 kilogram batches was combined and saponified in the same manner as in Example I. Only 1788 grams of 7-dehydrocholesterol having a purity of 85.1 per cent were obtained. Thus only 1521 grams of pure 7-dehydrocholesterol or 63 grams of 7-dehydrocholesterol per each kilogram of cholesteryl benzoate employed as the starting material were obtained as compared to the 111 grams of 7-dehydrocholesterol per kilogram of cholesteryl benzoate obtained in Example I where a smaller amount of cholesteryl benzoate had been processed by the prior art procedure.

Example III

Another 12 kilogram batch of cholesteryl benzoate was processed employing the same proportions of hexane and N-bromo succinimide and lauroyl peroxide as in Example II. The mixture was refluxed for 20 minutes as in the previous examples, cooled to room temperature and the succinimide filtered therefrom. The succinimide was washed with hexane as in the previous examples using the same proportionate amount of hexane as in the previous examples. The combined hexane solution and hexane washings were then concentrated in vacuo at 50° C. to about ⅓ their volume. Then, instead of completely removing the hexane as in the previous examples and as has been the custom in the prior art, the hexane solution was instead cooled with stirring to —15° C. and kept at that temperature overnight. The 7-bromo cholesteryl benzoate crystallized from the cooled solution. It was filtered therefrom, sucked dry and then air dried. The 7-bromo cholesteryl benzoate obtained amounted to 9650 grams of material. The 7-bromo cholesteryl benzoate was then dehydrohalogenated in exactly the same manner as in the previous examples and the 7-dehydrocholesteryl benzoate recovered from the dehydrohalogenation reaction mixture as in the previous examples, giving 4376 grams of 7-dehydrocholesteryl benzoate having a purity of 86.5 per cent. Upon saponification of the ester as in Examples I and II and recovering the free sterol from the saponification mixture, 2899 grams of 7-dehydrocholesterol having a purity of 90.9 per cent were obtained. Thus 2634 grams of pure 7-dehydrocholesterol or a yield of 219.5 grams of 7-dehydrocholesterol per kilogram of cholesteryl benzoate employed as the starting material were obtained. This yield was approximately twice the yield obtained in the 9000 kilogram batch of Example I wherein the 7-bromo cholesteryl benzoate was separated from the halogenation reaction mixture in accordance with the prior art procedures and was over three times as great as the yield obtained from the 12 kilogram batches of Example II wherein the prior art procedure for separating the 7-bromo cholesteryl benzoate from the halogenation reaction mixture was also employed.

*Example IV*

Two other 12 kilogram batches of cholesteryl benzoate were processed as in Example III. In the first batch 9800 grams of 7-bromo cholesteryl benzoate were obtained which on dehydrohalogenation gave 3598 grams of 7-dehydrocholesteryl benzoate having a purity of 83.9 per cent. In the second 12 kilogram batch 9400 grams of 7-bromo cholesteryl benzoate were obtained which on dehydrohalogenation gave 3849 grams of 7-dehydrocholesteryl benzoate having a purity of 87.3 per cent. The two batches of benzoate ester were combined for the saponification to produce the free sterol. The saponification was carried out in the same manner as in the previous examples. The yield of 7-dehydrocholesterol was 4551 grams of material having a purity of 97.0 per cent. Thus 4414 grams of pure 7-dehydrocholesterol or 184 grams of 7-dehydrocholesterol per kilogram of cholesteryl benzoate employed as the starting material were obtained. Thus, again the process of the invention gave a yield about three times as great as the yield obtained when operating in accordance with the prior art procedure as illustrated by Example II.

*Example V*

Two 15 kilogram batches of cholesteryl benzoate were processed in accordance with the process of the invention as set forth in Examples III and IV with the exception that in the present example the hexane solution containing the 7-bromo cholesteryl benzoate was not concentrated prior to crystallizing the 7-bromo cholesteryl benzoate therefrom. Instead, the dilute hexane solution of the 7-bromo cholesteryl benzoate after removal of the succinimide was cooled without any concentration whatever to a temperature of —15° C. and the 7-bromo cholesteryl benzoate which crystallized therefrom after the solution had been held at the low temperature overnight was filtered from the cooled solution giving in the first batch a yield of 11,285 grams of 7-bromo cholesteryl benzoate and in the second batch a yield of 10,819 grams of 7-bromo-cholesteryl benzoate. On dehydrohalogenation as carried out in all the previous examples, the first batch gave 5592 grams of 7-dehydrocholesteryl benzoate having a purity of 87 per cent and the second batch gave a yield of 5291 grams of 7-dehydrocholesteryl benzoate having a purity of 87.7 per cent. The two batches of 7-dehydrocholesteryl benzoate were then combined for the saponification to the free sterol. The free 7-dehydrocholesterol was recovered from the saponification reaction mixture in a yield of 7262 grams having a purity of 92.7 per cent. Thus a total yield of 6732 grams of pure 7-dehydrocholesterol or a yield of 224 grams of 7-dehydrocholesterol per kilogram of cholesteryl benzoate employed as the starting material was obtained. Thus again the procedure of the invention gave outstandingly higher yields of the desired product and a somewhat purer product than could be obtained with the prior art procedures.

Having described our invention, what we claim as new and desire to secure by Letters Patent is:

1. In a process for the production of a 7-dehydrosterol, the step comprising isolating a 7-halogeno sterol ester from the halogenation reaction mixture in which it was formed by cooling the halogenation reaction mixture to a temperature of at least about 0° C. and then separating from the cooled solution the 7-halogeno sterol ester which crystallizes at the low temperature, said cooling of the solution to the low temperature being carried out after removal from the halogenation reaction mixture of the nitrogen compound formed by the reaction of the sterol ester and the halogeno nitrogen compound employed as the halogenating agent.

2. The process of claim 1 wherein the sterol is an ester of cholesterol.

3. The process of claim 1 wherein the sterol ester is cholesteryl benzoate.

4. The process of claim 1 wherein the halogenation reaction is carried out in an aliphatic hydrocarbon solvent.

5. The process of claim 1 wherein the halogenation reaction is carried out in hexane.

6. The process of claim 1 wherein the halogenation reaction mixture is cooled to a temperature of at least about —10° C.

7. The process of claim 1 wherein the sterol ester is cholesteryl benzoate, the halogenation reaction is carried out in an aliphatic hydrocarbon solvent, and the halogenation reaction mixture is cooled to a temperature of at least about —10° C.

8. The process of claim 7 wherein the hydrocarbon solvent is hexane.

ROLAND KAPP.
SAUL CHODROFF.
LE ROY SOFIELD.

References Cited in the file of this patent

UNITED STATES PATENTS

| Number | Name | Date |
|---|---|---|
| 2,498,390 | Bernstein | Feb. 21, 1950 |
| 2,500,576 | Ruigh | Mar. 14, 1950 |
| 2,503,385 | Gould | Apr. 11, 1950 |